United States Patent
Chang et al.

(10) Patent No.: US 8,514,895 B2
(45) Date of Patent: Aug. 20, 2013

(54) BIT-STUFFING METHOD FOR CROSSTALK AVOIDANCE IN HIGH-SPEED BUSES

(75) Inventors: Cheng-Shang Chang, Hsinchu (TW); Jay Cheng, Hsinchu (TW); Tien-Ke Huang, Hsinchu (TW); Xuan-Chao Huang, Kaohsiung County (TW); Duan-Shin Lee, Taipei (TW); Chao-Yi Chen, Tainan County (TW)

(73) Assignee: National Tsing Hua University, Hsin-Chu (TW)

(*) Notice: Subject to any disclaimer, the term of this patent is extended or adjusted under 35 U.S.C. 154(b) by 530 days.

(21) Appl. No.: 12/853,444

(22) Filed: Aug. 10, 2010

(65) Prior Publication Data

US 2011/0222622 A1    Sep. 15, 2011

(30) Foreign Application Priority Data

Mar. 12, 2010 (TW) ................................. 99107409 A

(51) Int. Cl.
    *H04J 3/07*      (2006.01)
(52) U.S. Cl.
    USPC ........................................................ 370/505
(58) Field of Classification Search
    None
    See application file for complete search history.

(56) References Cited

U.S. PATENT DOCUMENTS

| | | | |
|---|---|---|---|
| 4,750,169 A * | 6/1988 | Carse et al. | 370/521 |
| 5,583,872 A * | 12/1996 | Albrecht et al. | 370/476 |
| 5,598,406 A * | 1/1997 | Albrecht et al. | 370/296 |
| 6,054,942 A * | 4/2000 | Stemmler | 341/58 |
| 6,950,960 B2 * | 9/2005 | Mohammad | 713/600 |
| 8,166,221 B2 * | 4/2012 | Lee et al. | 710/74 |
| 2002/0059488 A1 * | 5/2002 | Ishida et al. | 710/65 |
| 2002/0124200 A1 * | 9/2002 | Govindaraman | 713/400 |
| 2003/0018925 A1 * | 1/2003 | Mohammad | 713/600 |
| 2005/0163272 A1 * | 7/2005 | Payne et al. | 375/354 |
| 2006/0023824 A1 * | 2/2006 | Greco et al. | 375/371 |
| 2009/0085779 A1 * | 4/2009 | Tsao et al. | 341/50 |
| 2009/0109071 A1 * | 4/2009 | Hazzard et al. | 341/100 |
| 2010/0202493 A1 * | 8/2010 | Soliman et al. | 375/130 |
| 2011/0008039 A1 * | 1/2011 | Welch et al. | 398/1 |

\* cited by examiner

*Primary Examiner* — Mark Rinehart
*Assistant Examiner* — Prenell Jones
(74) *Attorney, Agent, or Firm* — WPAT, P.C.; Anthony King

(57) ABSTRACT

This invention discloses a bit-stuffing method for crosstalk avoidance in high-speed buses, which comprises the steps of inputting a plurality of data bit streams in parallel to a data input buffer; the data input buffer sequentially inputting data bits of the data bit streams to a bit-switching unit, and the bit-switching unit switching the data bits to generate bit-switched data; parallelly inputting the bit-switched data to a bit-stuffing encoding unit; the bit-stuffing encoding unit performing bit-stuffing encoding on the bit-switched data to generate encoded data bits and inputting the encoded data bits to an encoded data buffer; and the encoded data buffer outputting the encoded data to a high-speed bus. The encoded data bits passed through the high-speed bus are decoded using a bit-removing method to recover the data bit streams.

11 Claims, 18 Drawing Sheets

BIT-STUFFING METHOD FOR CROSSTALK AVOIDANCE IN HIGH-SPEED BUSES

FIELD OF THE INVENTION

The exemplary embodiment(s) of the present invention relates to a bit-stuffing method for crosstalk avoidance in high-speed buses. More specifically, the exemplary embodiment(s) of the present invention relates to a bus encoding method for eliminating crosstalk between adjacent wires in high-speed buses by encoding the input data bits to be transmitted over the bus wires.

BACKGROUND OF THE INVENTION

In electronics and electric circuits, crosstalk effect is usually caused by inductive coupling and capacitive coupling between two wires that are very close to each other, which results in undesired signal interference. Specifically, capacitive coupling induces coupling current and inductive coupling induces coupling voltage, and both would be detrimental to the signal transmitted over the wires.

With the advances of VLSI technologies and the increase of the operating clock rates in VLSI circuits, the wires in long on-chip buses are very close to each other and induce large coupling capacitance and inductance. Thus, the crosstalk effect has to be taken into consideration in deep sub-micron designs when dealing with the propagation delay through long on-chip buses. FIG. 1 shows data bit patterns that would induce serious crosstalk and hence should be forbidden. As shown, the transmitted bits 11 are transmitted over two adjacent wires in a bus in two consecutive transmissions. When the transmitted bits 11 equal to one of the two forbidden transition patterns 12 as shown in FIG. 1, the crosstalk between the two wires is serious such that the propagation delay of the transmitted bits 11 over the bus wires cannot be easily shortened. Bus encoding is one of the several methods known in the literature that can be applied to mitigate the crosstalk effect and hence further increases the transmission throughput of the bus.

FIG. 2 shows the configuration of a first prior art of the bus encoding method for crosstalk avoidance known as "ground-shielding", with which every two input data bits 21 are encoded into four coded bits 23 by the encoder 22. As can be seen in FIG. 2, the encoder 22 always generates bit 0 on the second and the fourth wires so that the forbidden transition patterns can be avoided. Furthermore, the coding rate (or throughput) of this first prior art encoding method is 0.5 since only half of the wires in the bus are used for transmitting data bits.

FIG. 3 shows the configuration of a second prior art of the bus encoding method for crosstalk avoidance when applied to a bus with four wires, which is disclosed by B. Victor and K. Keutzer in "Bus Encoding to Prevent Crosstalk Delay" in Proceedings of 2001 IEEE/ACM International Conference on Computer-Aided Design. As shown in FIG. 3, the first three data bits 001 of the input data bits 31 are encoded by the encoder 32 with the codebook 34 to generate four coded bits 0001 (from the bottom to the top) as the output bits 33; and then the last three data bits 110 of the input data bits 31 (or equivalently, the input data bits 311) are encoded by the encoder 321 with the codebook 34 to generate four coded bits 1101 (from the bottom to the top) as the output bits 331. Obviously, the coding rate of this application of the second prior art encoding method is 0.75.

It can be shown that the coding rate of the above second prior art encoding method is 0.6942 when the number of wires is sufficiently large, which is much greater than the coding rate 0.5 of the first prior art "ground shielding". The main problem of this second prior art is the high implementation complexity of the encoder and the decoder.

In view of the low coding rate of the prior art bus encoding methods, it is necessary to develop a simple bus encoding method with high coding rate and low implementation complexity to achieve better system performance.

SUMMARY OF THE INVENTION

A primary object of the present invention is to provide a simple bit-stuffing method for crosstalk avoidance in high-speed buses with high coding rate and low hardware complexity.

To achieve this object, the bit-stuffing method for crosstalk avoidance in high-speed buses according to the present invention comprises the steps of inputting a plurality of data bit streams in parallel to a data input buffer; the data input buffer inputting data bits of the data bit streams to a bit-switching unit; the bit-switching unit switching the data bits to generate bit-switched data and inputting the bit-switched data to a bit-stuffing encoding unit; the bit-stuffing encoding unit performing bit-stuffing encoding on the bit-switched data to generate encoded data bits and inputting the encoded data bits to an encoded data buffer; and the encoded data buffer outputting the encoded data to a high-speed bus.

In the bit-stuffing method of the present invention, the bus consists of a plurality of parallel wires.

In the bit-stuffing method of the present invention, each of the data bit streams is a sequence of data bits.

In the bit-stuffing method of the present invention, the number of the data bit streams is the same as that of the wires in the high-speed bus.

In the bit-stuffing method of the present invention, the data bits are to be transmitted over the wires in the high-speed bus.

In the bit-stuffing method of the present invention, the bit-switching unit is constructed by a plurality of 2×2 switches.

In the bit-stuffing method of the present invention, the bit-switching unit switches the data bits during the second of every two transmissions by switching the data bits from each pair of two adjacent data bit streams, and sends the bit-switched data to the bit-stuffing encoding unit.

In the bit-stuffing method of the present invention, the encoded data passing through the high-speed bus are decoded by a bit-removing method via the steps of inputting the received encoded data to a data input buffer; the data input buffer inputting the encoded data bits to the bit-removing decoding unit to recover the bit-switched data; inputting the bit-switched data to a bit-switching unit to convert the bit-switched data into decoded data bits; inputting the decoded data bits into a decoded data buffer; and finally, outputting the decoded data from the decoded data buffer.

With the above arrangements, the bit-stuffing method for crosstalk avoidance in high-speed buses according to the present invention has the following advantages:

(1) It avoids the occurrence of the forbidden transition patterns and accordingly, mitigates the crosstalk effect due to the coupling between adjacent wires in the buses;

(2) The coding rate is much better than previous methods for crosstalk avoidance; and (3) Its encoding and decoding methods are very simple and thus can be implemented with very low hardware cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
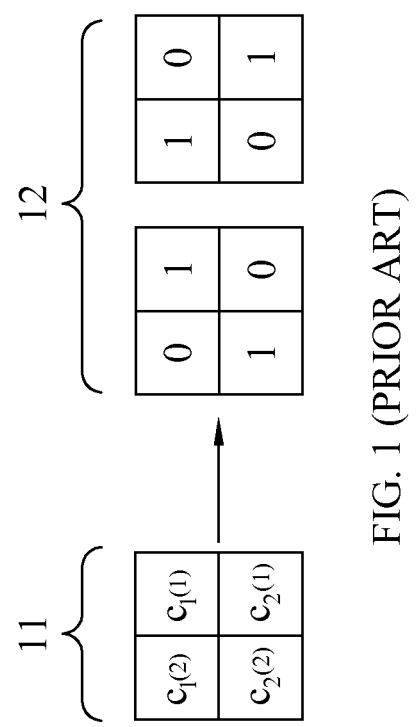
FIG. 1 is a conceptual view showing data bit patterns that would induce serious crosstalk and hence should be forbidden.
Figure 2:
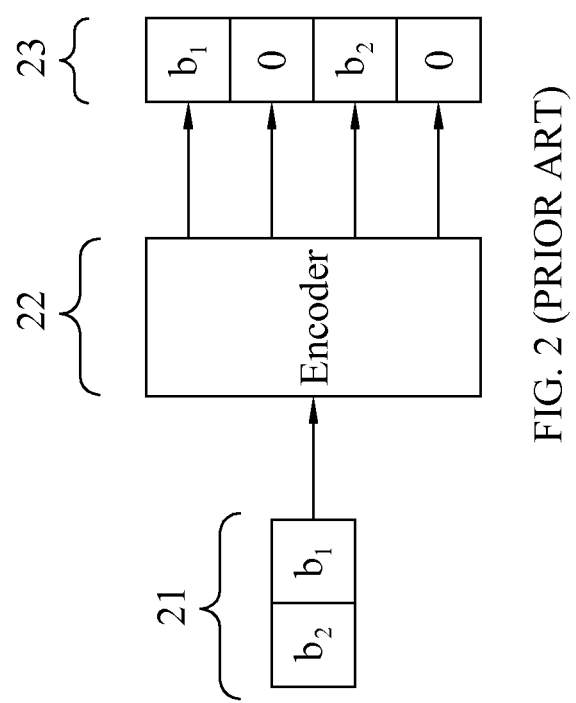
FIG. 2 shows the configuration of a first prior art of the bus encoding method for crosstalk avoidance.
Figure 3:
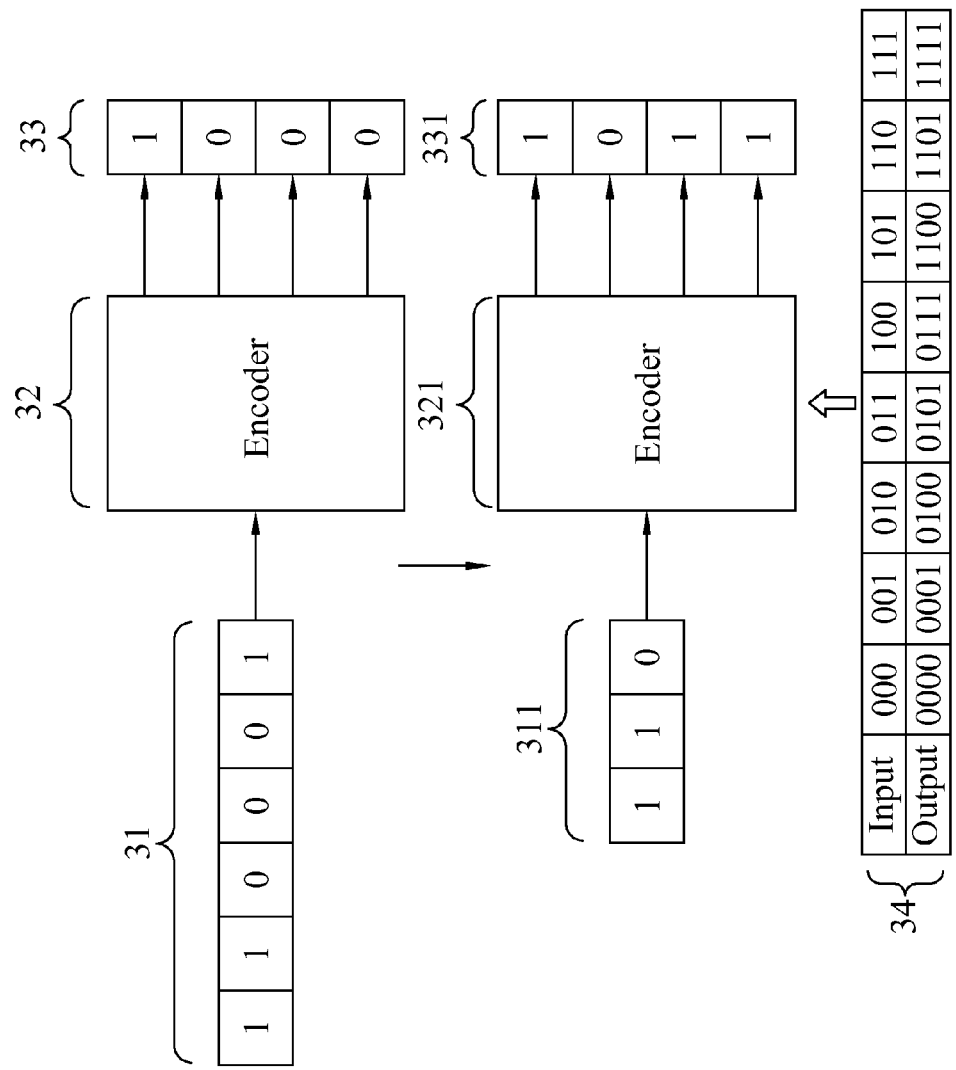
FIG. 3 shows the configuration of a second prior art of the bus encoding method for crosstalk avoidance.
Figure 4:
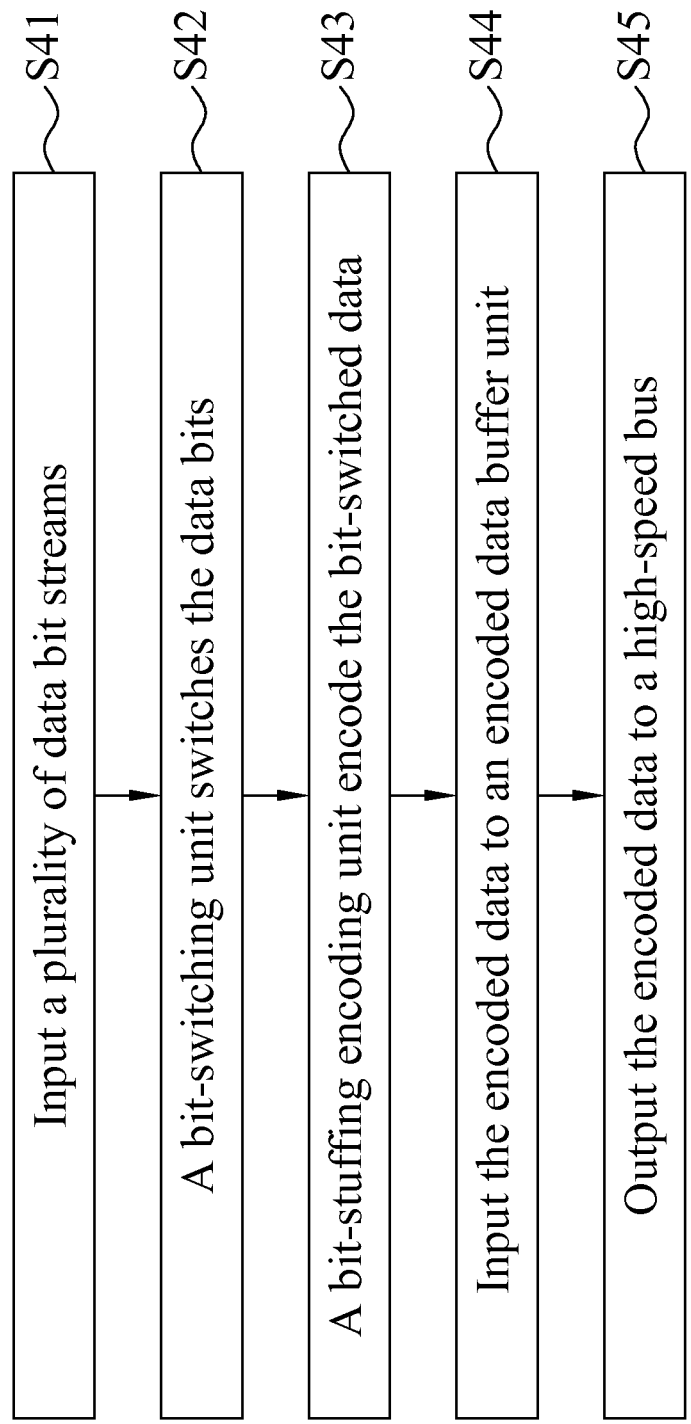
FIG. 4 is a flowchart showing the steps included in a bit-stuffing method for crosstalk avoidance in high-speed buses according to the present invention.

Please refer to FIG. 4. In the bit-stuffing method for crosstalk avoidance in high-speed buses according to the present invention, the following steps are included.

In step S41, a plurality of data bit streams are inputted to a data input buffer. Following in step S42, the data input buffer parallelly inputs data bits of the data bit streams to a bit-switching unit, and the bit-switching unit switches the data bits to generate bit-switched data. Then, in step S43, the bit-switched data are parallelly inputted to a bit-stuffing encoding unit, and the bit-stuffing encoding unit performs encoding on the bit-switched data to generate encoded data. Next, in step S44, the encoded data are inputted to an encoded data buffer. Finally, in step S45, the encoded data buffer outputs the encoded data to a high-speed bus.

Figure 5:
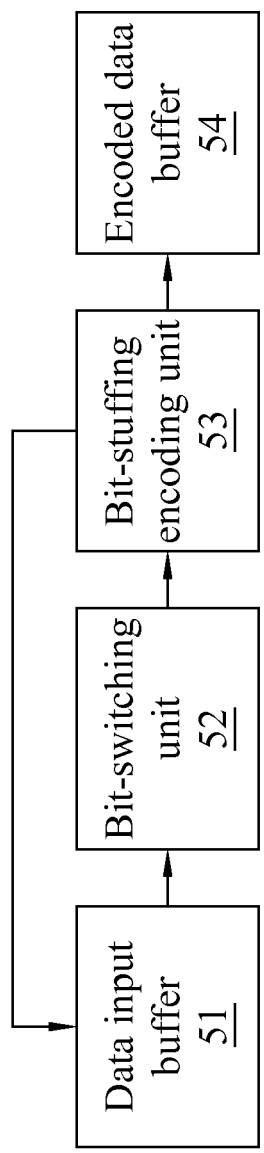
FIG. 5 is a configuration diagram showing the encoding application of the bit-stuffing method for crosstalk avoidance in high-speed buses according to the present invention.

Please refer to FIG. 5 that is a configuration diagram showing the encoding application of the bit-stuffing method for crosstalk avoidance in high-speed buses according to the present invention. As shown, to implement the bit-stuffing method of the present invention, there is provided a data input buffer 51, a bit-switching unit 52, a bit-stuffing encoding unit 53, and an encoded data buffer 54. According to the bit-stuffing method of the present invention, when data bit streams are inputted to the data input buffer 51, the data input buffer 51 parallelly inputs the individual data bits via multiple wires to the bit-switching unit 52. Then, the bit-switching unit 52 performs data bits switching during the second of every two transmissions. That is, the bit-switching unit 52 switches the bit positions in every pair of data bits from two adjacent wires and sends bit-switched data to the bit-stuffing encoding unit 53. Later on, the bit-stuffing encoding unit 53 inputs encoded data to the encoded data buffer 54. Finally, the encoded data buffer 54 outputs the encoded data to a high-speed bus, from where the encoded data are further transmitted to a destination.

Figure 6:
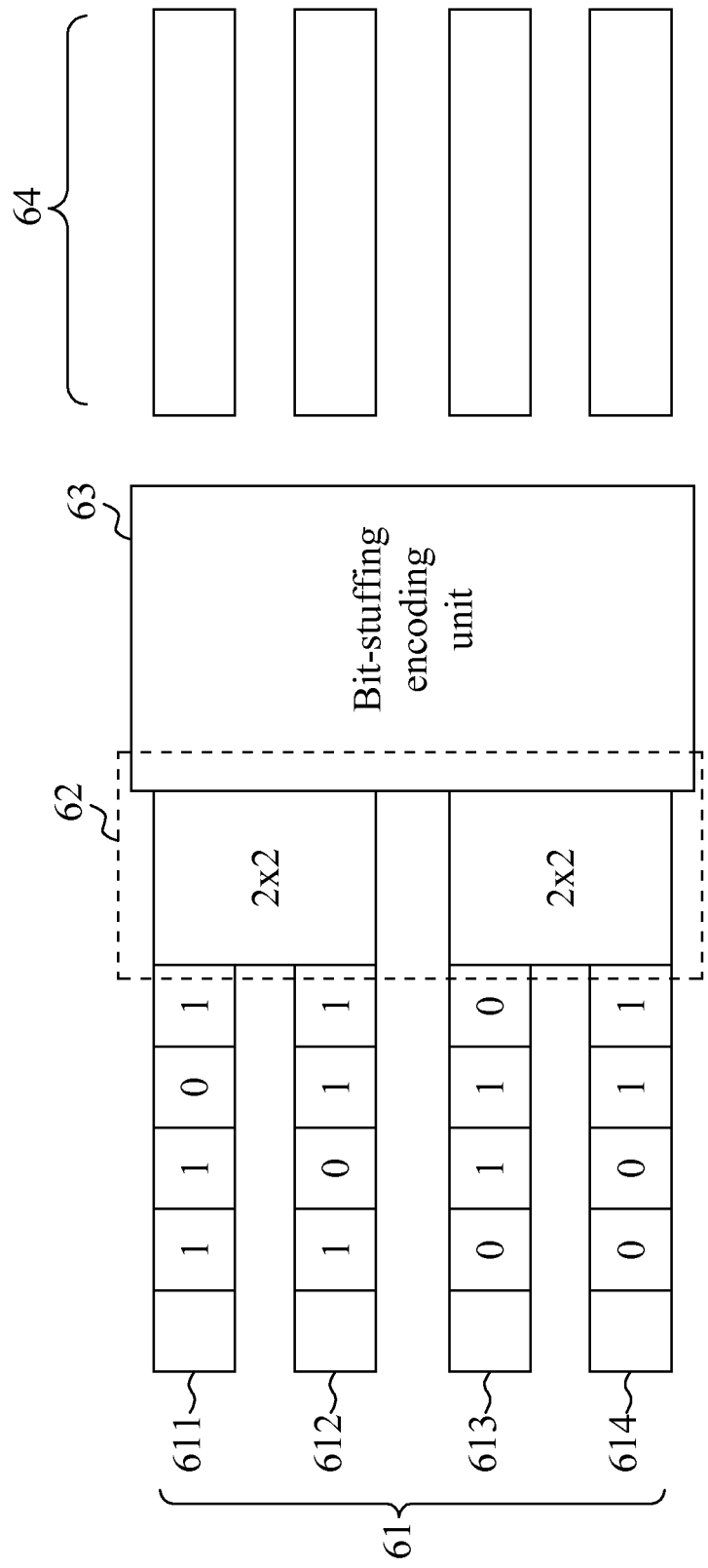
FIG. 6 is a conceptual view of a bit-switching unit used in implementing the bit-stuffing method for crosstalk avoidance in high-speed buses according to the present invention.

Please refer to FIG. 6 that is a conceptual view of a bit-switching unit 62 used in implementing the bit-stuffing method for crosstalk avoidance in high-speed buses according to the present invention. As shown, data bits in a data input buffer 61 include a first data bit stream 611, a second data bit stream 612, a third data bit stream 613, and a fourth data bit stream 614. In FIG. 6, a bit-switching unit 62 consisting of two 2×2 switches is illustrated. The bit-switching unit 62 generates bit-switched data, which will be encoded by a bit-stuffing encoding unit 63 and then output to an encoded data buffer 64.

Figure 7:
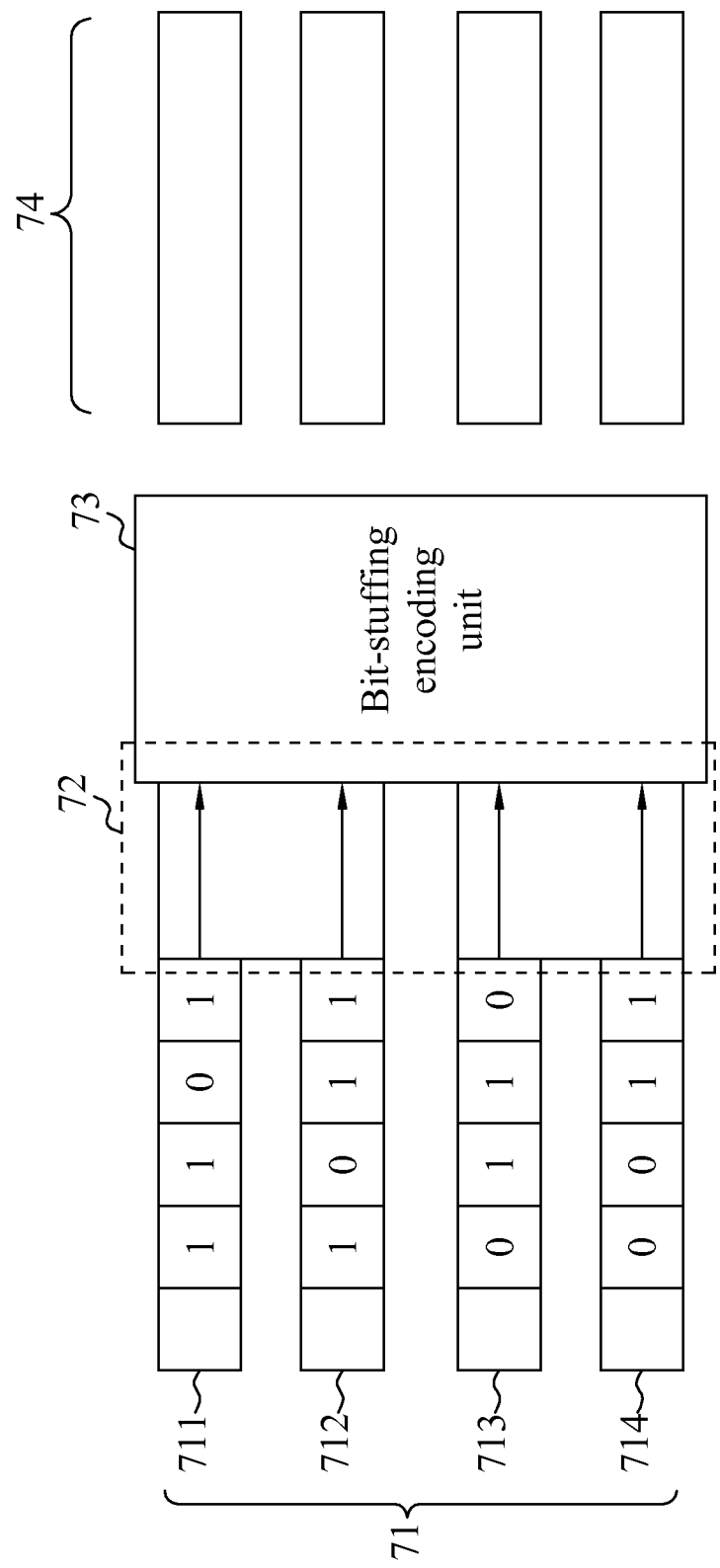
FIG. 7 shows the configuration of the bit-switching unit for the bit-stuffing method for crosstalk avoidance in high-speed buses during the first of every two transmissions according to the present invention.

FIG. 7 shows the configuration of the bit-switching unit for the bit-stuffing method for crosstalk avoidance in high-speed buses during the first of every two transmissions according to the present invention. For portions of the structure shown in FIG. 7 that are similar to those in FIG. 6, they are not repeatedly described herein, and only other portions that are different between FIGS. 6 and 7 are described herein. During the first, the third, and the fifth transmissions, etc., the bit-switching unit 72 does not perform any bit switching.

Figure 8:
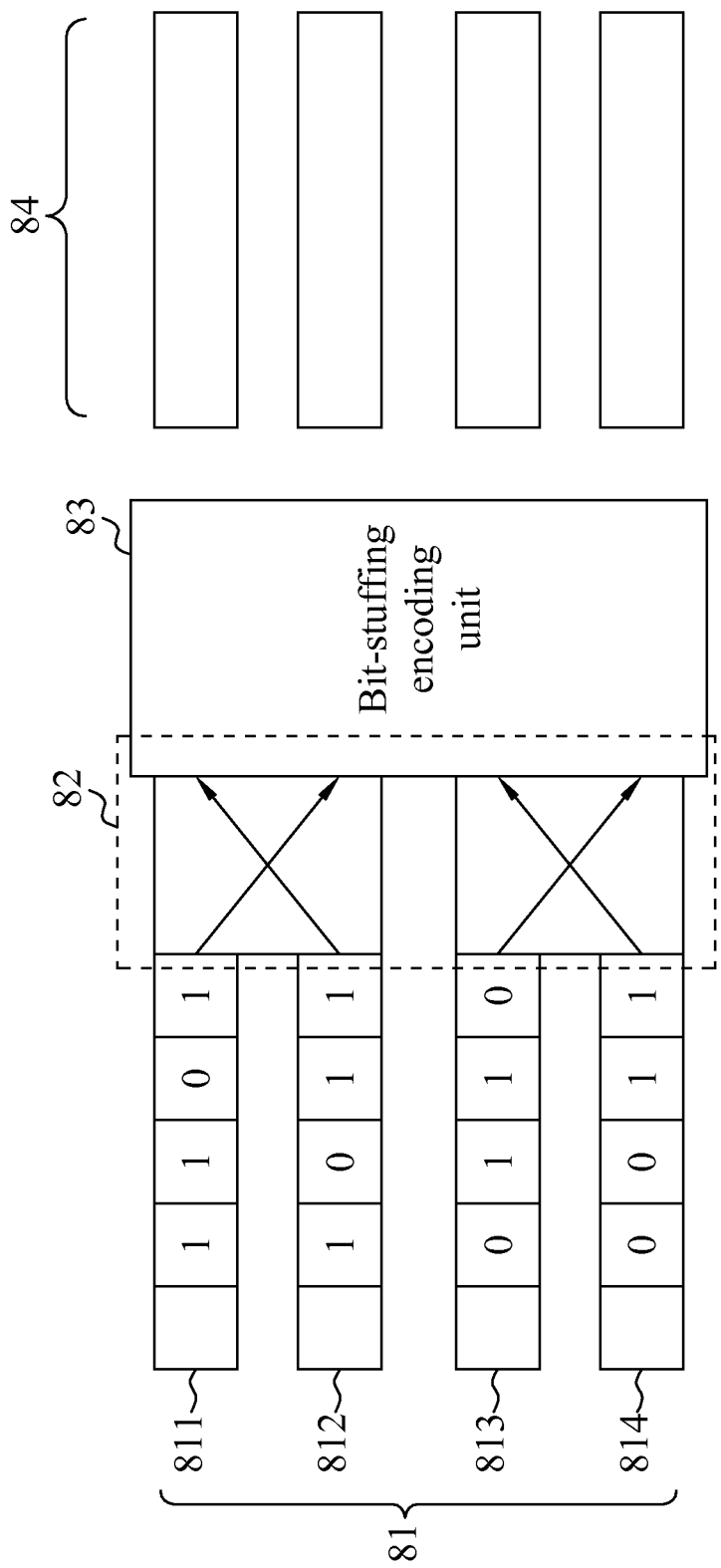
FIG. 8 shows the configuration of the bit-switching unit for the bit-stuffing method for crosstalk avoidance in high-speed buses during the second of every two transmissions according to the present invention.

FIG. 8 shows the configuration of the bit-switching unit for the bit-stuffing method for crosstalk avoidance in high-speed buses during the second of every two transmissions according to the present invention. For portions of the structure shown in FIG. 8 that are similar to those in FIGS. 6 and 7, they are not repeatedly described herein, only other portions that are different between FIG. 8 and FIGS. 6 and 7 are described. During the second, the fourth, and the sixth transmissions, and so on, the bit-switching unit 82 performs bit switching.

Figure 9:
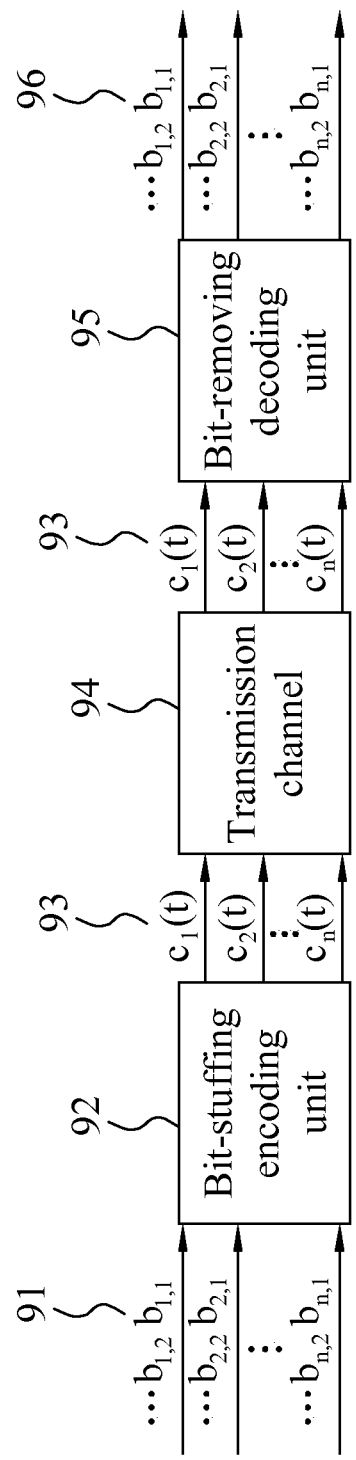
FIG. 9 is a conceptual view of a bit-stuffing encoding unit and a bit-removing decoding unit used in implementing the bit-stuffing method for crosstalk avoidance in high-speed buses according to the present invention.

FIG. 9 is a conceptual view of a bit-stuffing encoding unit 92 and a bit-removing decoding unit 95 used in implementing the bit-stuffing method for crosstalk avoidance in high-speed buses according to the present invention. As shown, in bit-switched data 91, individual switched data bits are presented in the form of "... $b_{i,2} b_{i,1}$", where i=1, 2, ..., n. A bit-stuffing encoding unit 92 encodes the bit-switched data 91 into encoded data 93, which are presented in the form of "$c_1(t), c_2(t), ..., c_n(t)$". The encoded data 93 are then transmitted via a transmission channel 94 to a bit-removing decoding unit 95, by which the encoded data 93 are decoded and converted into output data bits 96. The output data bits 96 are the same as the bit-switched data 91.

For the ease of description, it is assumed hereinafter that n is an even number, and we write the bit-switched data 91 as $\{b_{i,1}, b_{i,2}, \ldots\}$, where i=1, 2, ... n. The bit-stuffing encoding unit 92 applies a bit-stuffing encoding method to encode the bit-switched data $\{b_{i,1}, b_{i,2}, \ldots\}$, i=1, 2, ... n. At the beginning, $c_i(1)$ is set as $c_i(1)=b_{i,1}$, for i=1, 2, ..., n. When t is greater than or equal to 2, the coded bits $c_i(t)$, i=1, 2, ..., n, in the encoded data 93 are generated according to the following bit-stuffing encoding rules: First, set $c_i(t)$ as the next switched data bit transmitted over the $i^{th}$ wire, for i=1, 3, ..., n-1. For i=2, 4, ..., n, if $\overline{c}_{i-1}(t-1)=c_{i-1}(t)=c_i(t-1)$ or $\overline{c}_{i+1}(t-1)=c_{i+1}(t)=c_{i+1}(t-1)$, $c_i(t)$ is set to be equal to $c_i(t-1)$; otherwise, $c_i(t)$ is set as next switched data bit transmitted over the $i^{th}$ wire, where $\overline{c}_{i-1}(t-1)$ is the complement of $c_{i-1}(t-1)$, and $\overline{c}_{i+1}(t-1)$ is the complement of $c_{i+1}(t-1)$. As shown by the following expressions, when the occurrence of the forbidden transition patterns is possible, a stuffed bit 0 or 1 is stuffed at a position in the matrix corresponding to $c_i(t)$ as shown in the following equations, so as to avoid the occurrence of the forbidden transition patterns:

$$\begin{bmatrix} c_{i-1}(t) & c_{i-1}(t-1) \\ c_i(t) & c_i(t-1) \end{bmatrix} = \begin{bmatrix} 1 & 0 \\ & 1 \end{bmatrix} \text{ or } \begin{bmatrix} c_i(t) & c_i(t-1) \\ c_{i+1}(t) & c_{i+1}(t-1) \end{bmatrix} = \begin{bmatrix} & 1 \\ 1 & 0 \end{bmatrix}$$

If at least one of the above two conditions holds, a stuffed bit 1 is stuffed at the position in the matrix corresponding to $c_i(t)$.

$$\begin{bmatrix} c_{i-1}(t) & c_{i-1}(t-1) \\ c_i(t) & c_i(t-1) \end{bmatrix} = \begin{bmatrix} 0 & 1 \\ & 0 \end{bmatrix} \text{ or } \begin{bmatrix} c_i(t) & c_i(t-1) \\ c_{i+1}(t) & c_{i+1}(t-1) \end{bmatrix} = \begin{bmatrix} & 0 \\ 0 & 1 \end{bmatrix}$$

If at least one of the above two conditions holds, a stuffed bit 0 is stuffed at the position in the matrix corresponding to $c_i(t)$.

Whenever the data bits of a data bit stream are exhausted while there are still data bits in other data bit streams need to be encoded, the last coded bit having been generated from that stream will be repeated again by the bit-stuffing encoding unit.

Figure 10:
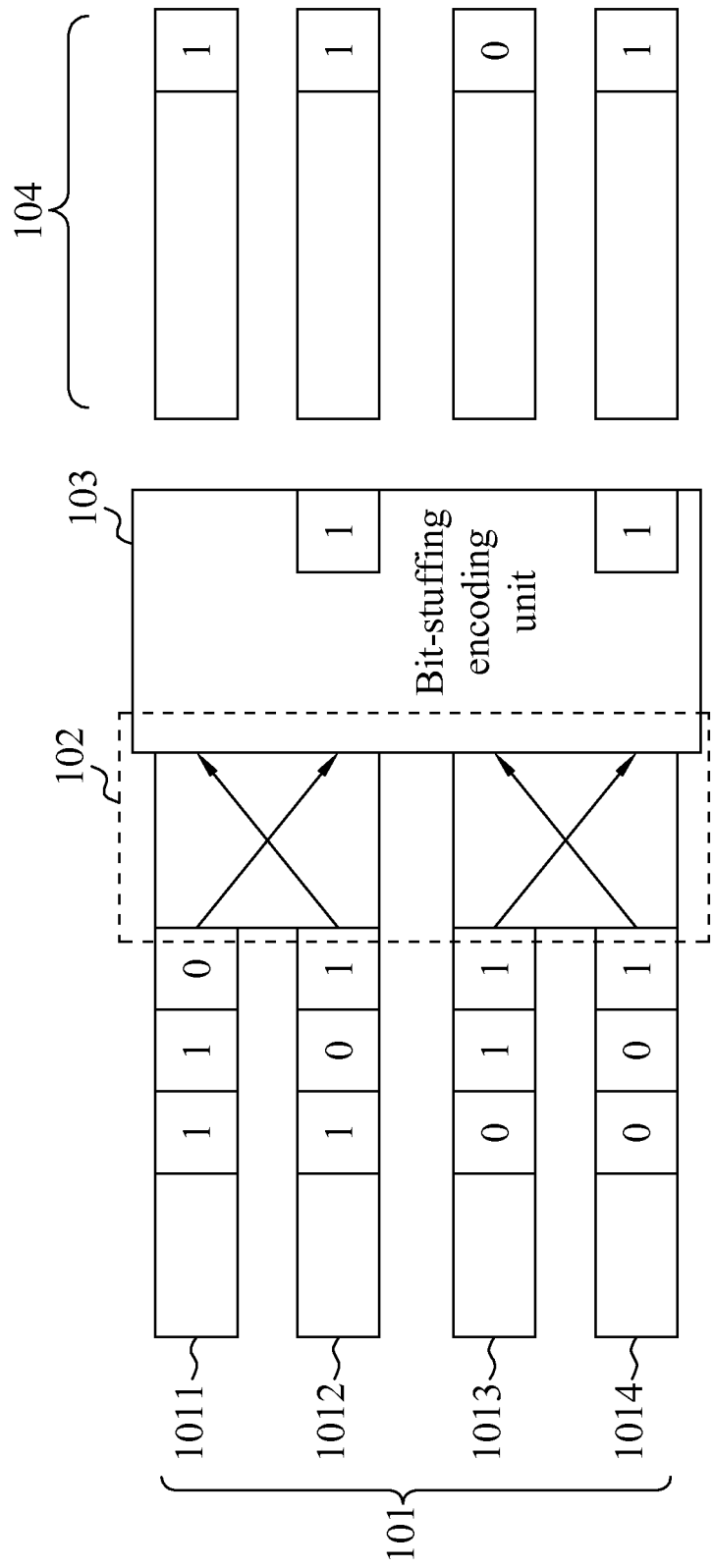
FIG. 10 shows the second transmission in an example of implementing the bit-stuffing method for crosstalk avoidance in high-speed buses according to the present invention.

Please refer to FIG. 10 that shows the second transmission in an example of implementing the bit-stuffing method for crosstalk avoidance in high-speed buses according to the present invention. As to the first transmission, please refer to FIG. 7. As shown in FIG. 10, the data input buffer 101 comprises four buffered data streams. When the first data bits of the second and the fourth buffered data streams pass through the bit-switching unit 102, since this is the second transmission, bit switching is performed. Bit-switched data are output to an encoded data buffer 104. When the data bit 1 of the fourth buffered data stream passes through the bit-switching unit 102, the forbidden transition patterns might occur at the second and the fourth data streams of the encoded data buffer 104. Therefore, the bit-stuffing encoding unit 103 generates stuffed bits for stuffing, and the first data bits of the first and the third buffered data streams of the data input buffer 101 are not transmitted. The result of the second transmission is shown in the encoded data buffer 104 in FIG. 11.

Figure 11:
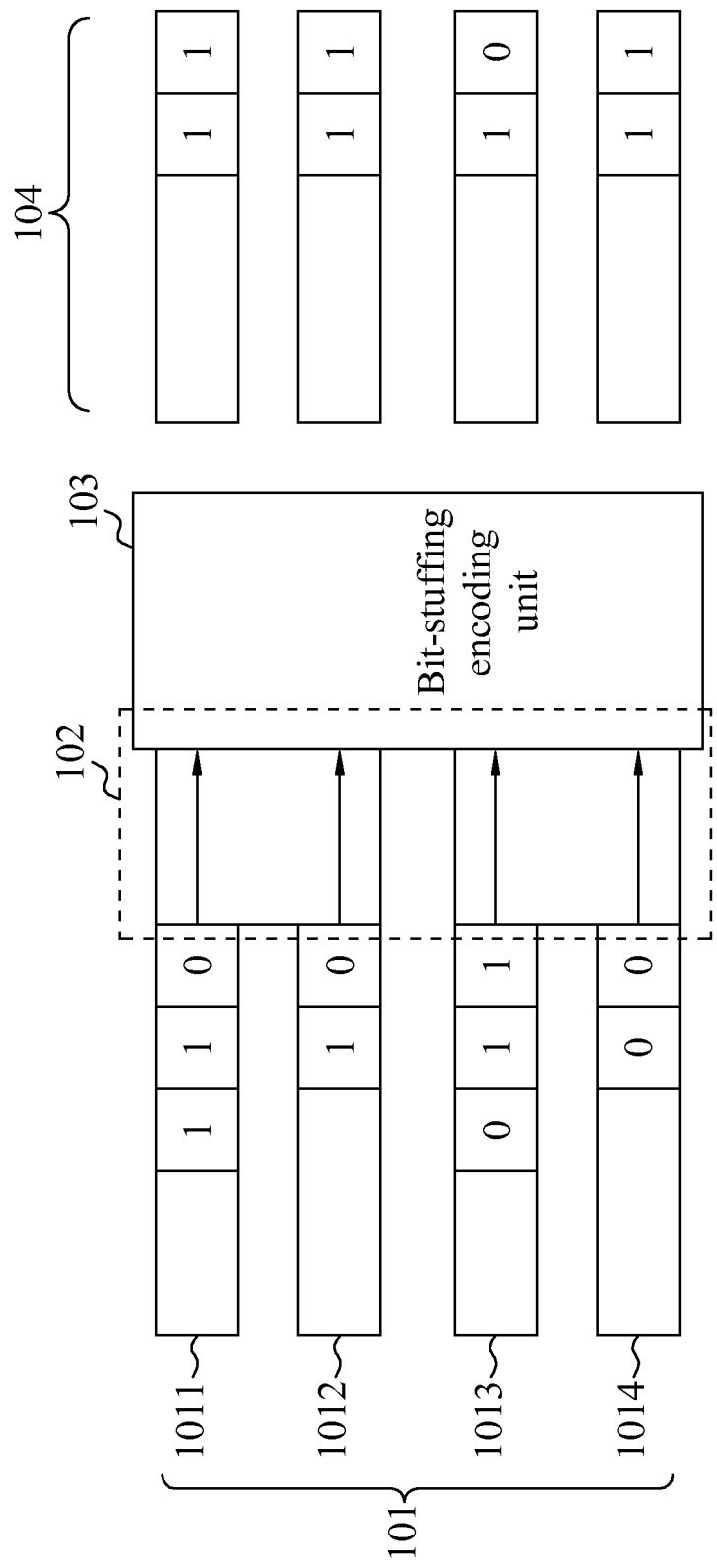
FIG. 11 shows the third transmission in an example of implementing the bit-stuffing method for crosstalk avoidance in high-speed buses according to the present invention.

Please refer to FIG. 11 that shows the third transmission in an example of implementing the bit-stuffing method for crosstalk avoidance in high-speed buses according to the present invention. As shown, the data input buffer 101 comprises four buffered data streams. When the first data bits of the first and the third buffered data streams pass through the bit-switching unit 102, since it is the third transmission, bit switching is not performed and the data bits are directly output to the encoded data buffer 104. Since the forbidden transition patterns will not occur, the bit-stuffing encoding unit 103 does not generate any stuffed bit, and the first data bits of the second and the fourth buffered data streams of the data input buffer 101 are output to the encoded data buffer 104. The result of the third transmission is shown in the encoded data buffer 104 in FIG. 12.

Figure 12:
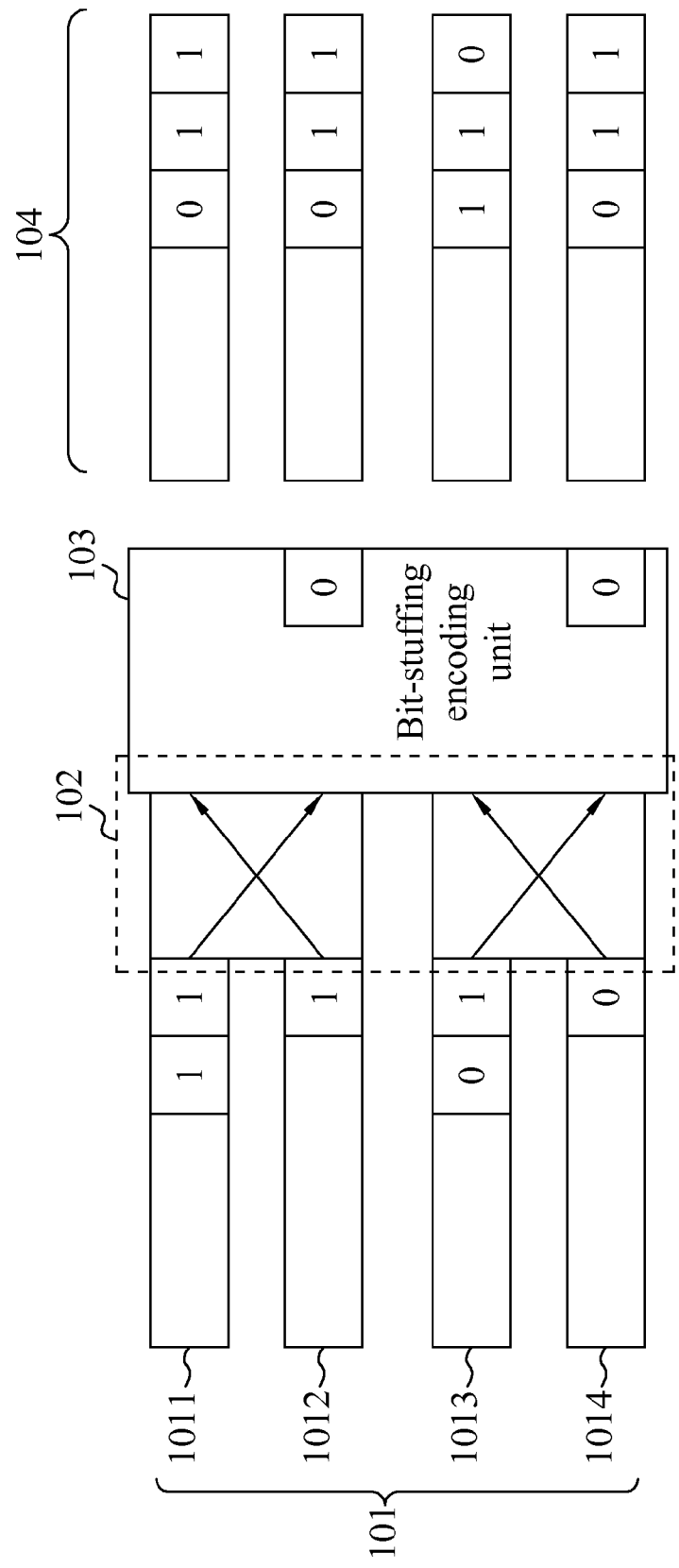
FIG. 12 shows the fourth transmission in an example of implementing the bit-stuffing method for crosstalk avoidance in high-speed buses according to the present invention.

Please refer to FIG. 12 that shows the fourth transmission in an example of implementing the bit-stuffing method for crosstalk avoidance in high-speed buses according to the present invention. As shown in FIG. 12, the data input buffer 101 comprises four buffered data streams. When the first data bits of the second and the fourth buffered data streams pass through the bit-switching unit 102, since it is the fourth transmission, bit switching is performed. The bit-switched data are output to the encoded data buffer 104. When the first data bit 0 of the fourth buffered data stream passes through the bit-switching unit 102, the forbidden transition patterns might occur at the second and the fourth data streams of the encoded data buffer 104. Therefore, the bit-stuffing encoding unit 103 generates stuffed bits for stuffing, and the first data bits of the first and the third buffered data streams of the data input buffer 101 are not transmitted. The result of the fourth transmission is shown in the encoded data buffer 104 in FIG. 13.

Figure 13:
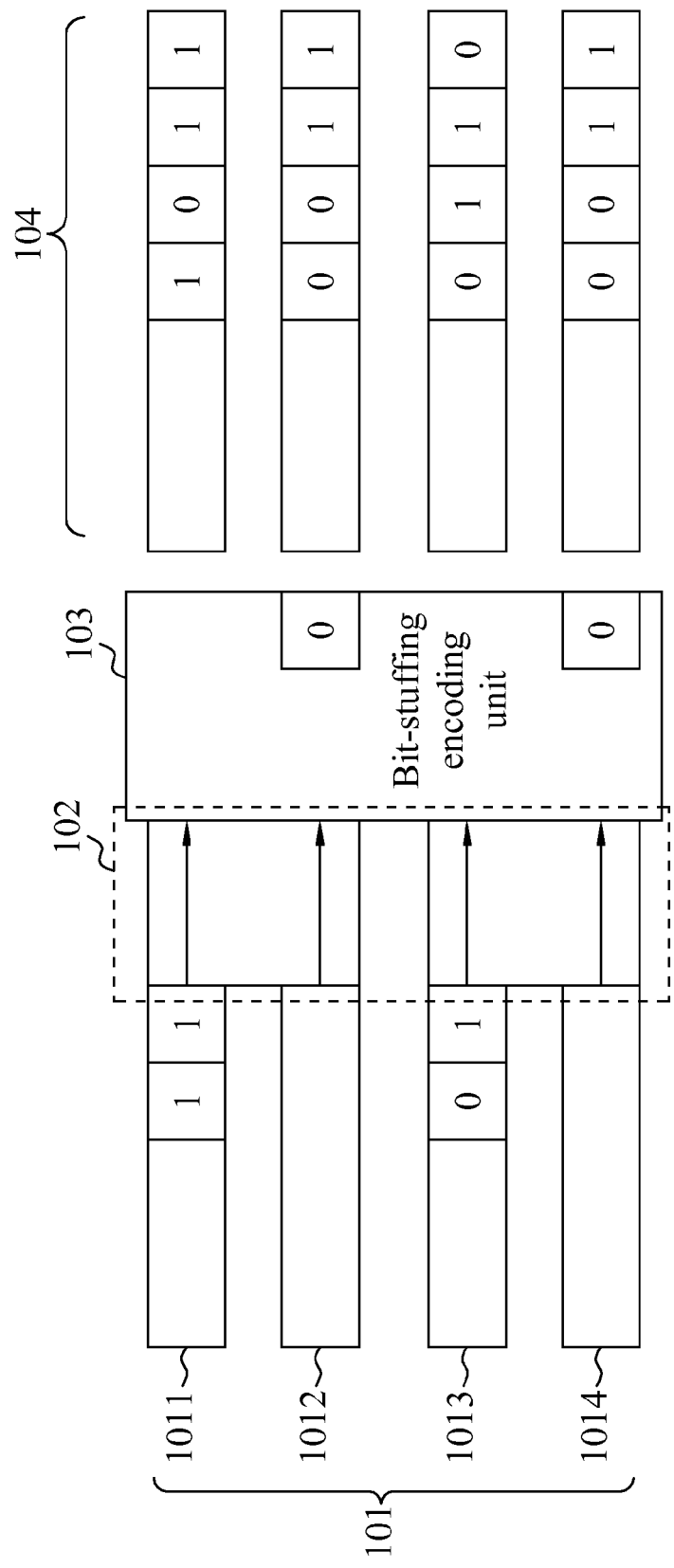
FIG. 13 shows the fifth transmission in an example of implementing the bit-stuffing method for crosstalk avoidance in high-speed buses according to the present invention.

Please refer to FIG. 13 that shows the fifth transmission in an example of implementing the bit-stuffing method for crosstalk avoidance in high-speed buses according to the present invention. As shown, the data input buffer 101 comprises four buffered data streams. When the first data bits of the first and the third buffered data streams pass through the bit-switching unit 102, since it is the fifth transmission, bit switching is not performed and the data bits are directly output to the encoded data buffer 104. Since there are no data bits left in the second and the fourth buffered data streams of the data input buffer 101, the bit-stuffing encoding unit 103 transmits again the encoded data that have been transmitted through the second and the fourth data streams of the encoded data buffer 104 during the previous transmission. The result of the fourth transmission is shown in the encoded data buffer 104 in FIG. 14.

Figure 14:
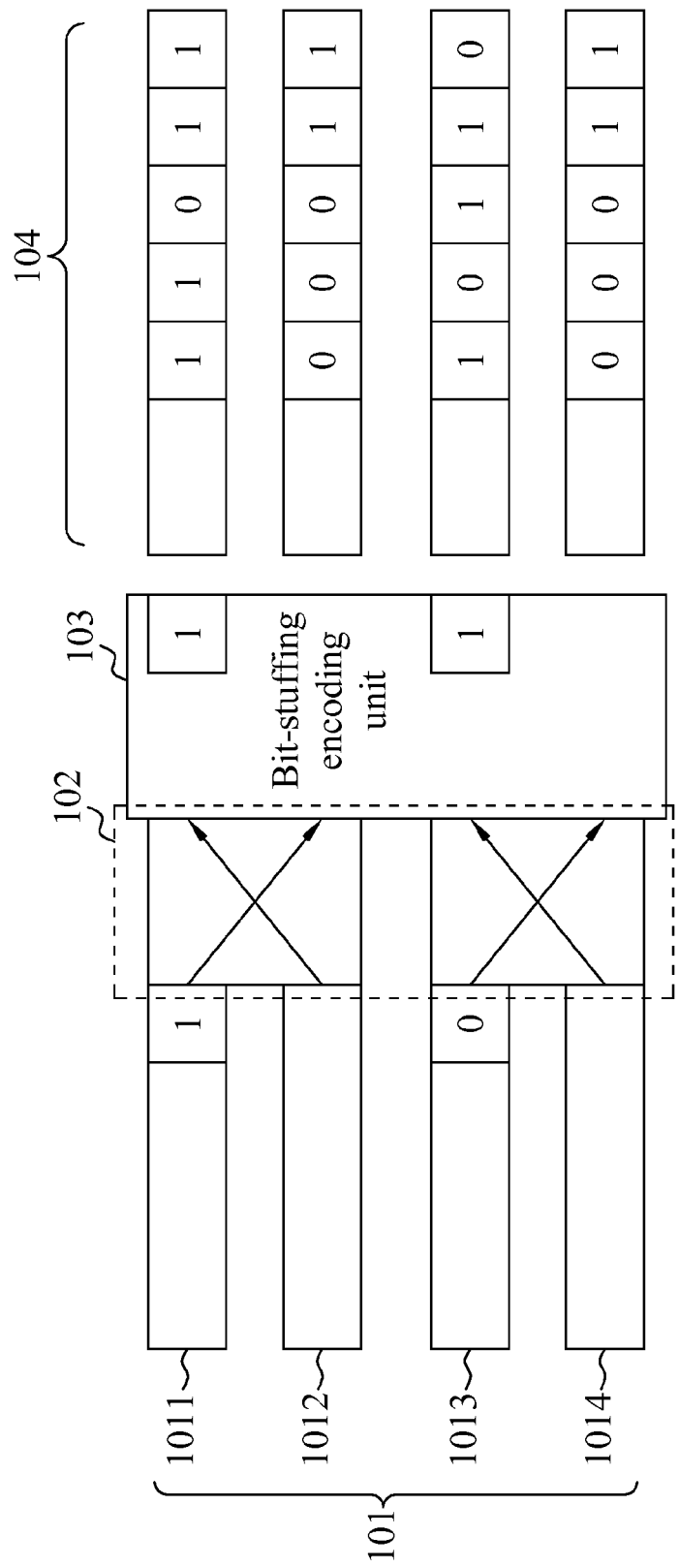
FIG. 14 shows the sixth transmission in an example of implementing the bit-stuffing method for crosstalk avoidance in high-speed buses according to the present invention.

Please refer to FIG. 14 that shows the sixth transmission in an example of implementing the bit-stuffing method for crosstalk avoidance in high-speed buses according to the present invention. As shown in FIG. 14, the data input buffer 101 comprises four buffered data streams. When the first data bits of the second and the fourth buffered data streams pass through the bit-switching unit 102, since it is the sixth transmission, bit switching is performed. The bit-switched data are output to the encoded data buffer 104. However, since there are no data bits left in the second and the fourth buffered data streams of the data input buffer 101, the bit-stuffing encoding unit 103 transmits again the encoded data that have been transmitted through the first and the third data streams of the encoded data buffer 104 during the previous transmission.

Figure 15:
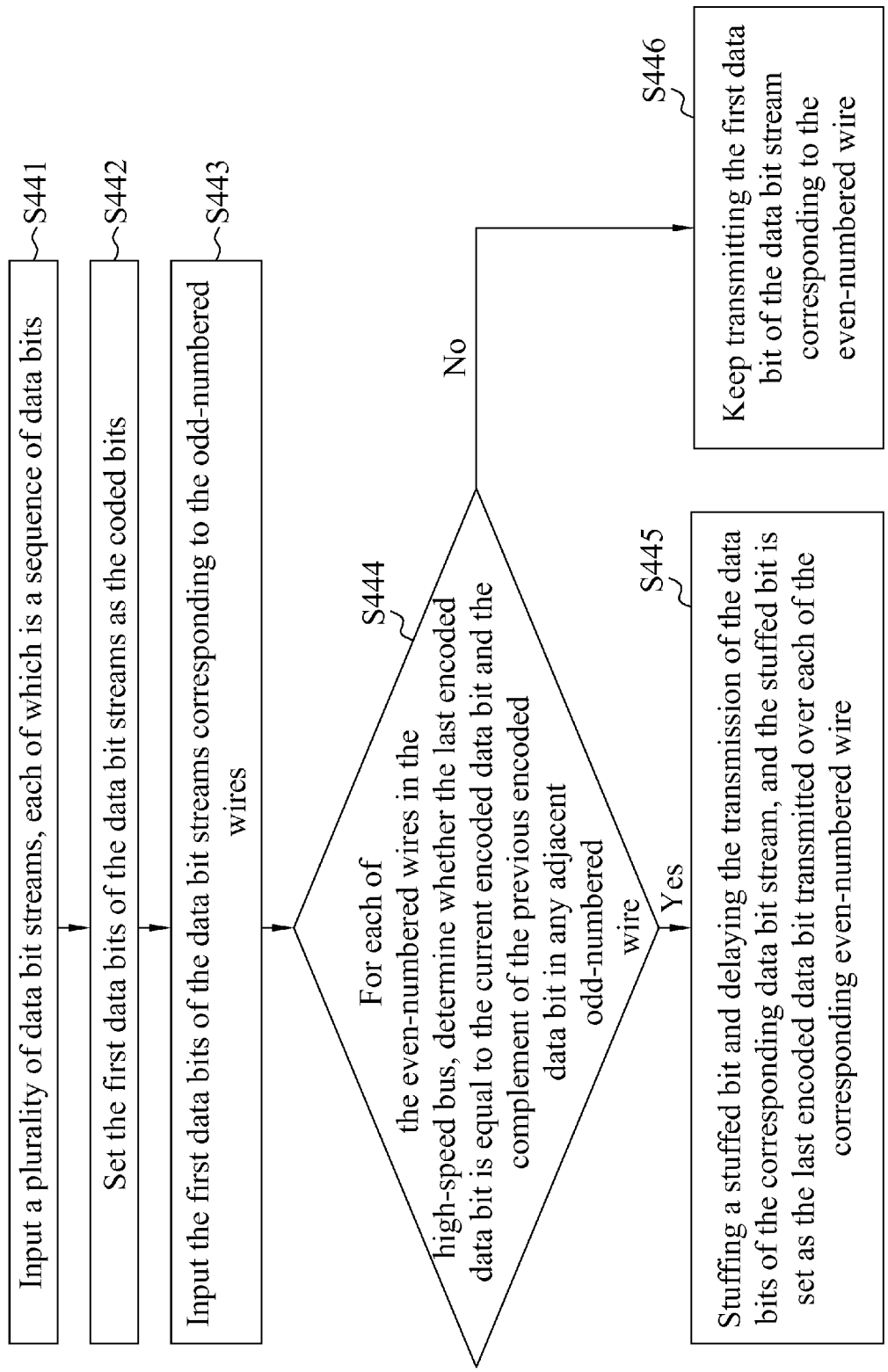
FIG. 15 is a flowchart showing the steps of the bit-stuffing encoding method according to the present invention.

FIG. 15 is a flowchart showing the steps of generating the encoded data by the bit-stuffing encoding unit according to the method of the present invention described in paragraphs [0051]-[0053]. The steps of the bit-stuffing encoding method include:

inputting a plurality of data bit streams, where each of the data bit streams is a sequence of data bits (step S441);

setting the first data bits of the data bit streams as the encoded data bits for the first transmission (step S442);

inputting the first data bits of the data bit streams corresponding to the odd-numbered wires in the high-speed bus (step S443);

for each of the even-numbered wires in the high-speed bus, determine whether the last encoded data bit is equal to the current encoded data bit and the complement of the previous encoded data bit on any adjacent odd-numbered wire (step S444); and if yes, stuffing a stuffed bit and delaying the transmission of the data bits of the corresponding data bit stream, and the stuffed bit is set as the last encoded data bit transmitted over the corresponding even-numbered wire (step S445); or if no, keeping transmitting the first data bit of the data bit stream corresponding to the even-numbered wire (step S446).

Figure 16:
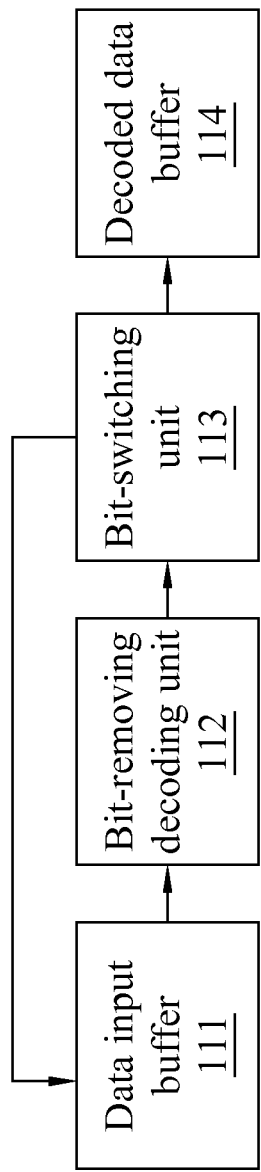
FIG. 16 is a configuration diagram showing the decoding application of the bit-removing method corresponding to the bit-stuffing method for crosstalk avoidance in high-speed buses according to the present invention.

FIG. 16 is a configuration diagram showing the decoding application of the bit-stuffing method for crosstalk avoidance in high-speed buses according to the present invention. As shown, to implement the bit-removing decoding method of the present invention, there is provided a data input buffer 111, a bit-removing decoding unit 112, a bit-switching unit 113, and a decoded data buffer 114. According to the bit-removing decoding method of the present invention, when the received encoded data are input to the data input buffer 111, the data input buffer 111 will parallelly output the individual bits of the encoded data via multiple wires to the bit-removing decoding unit 112. The bit-removing decoding unit 112 will output the decoded bit-switched data to the bit-switching unit 113, and the bit-switching unit 113 will perform data bits switching during the second of every two transmissions, so as to recover the bit positions in each pair of two adjacent data streams and transmit the data bits to the decoded data buffer 114. Then, the decoded data buffer 114 outputs the original data bits to the destination.

Figure 17:
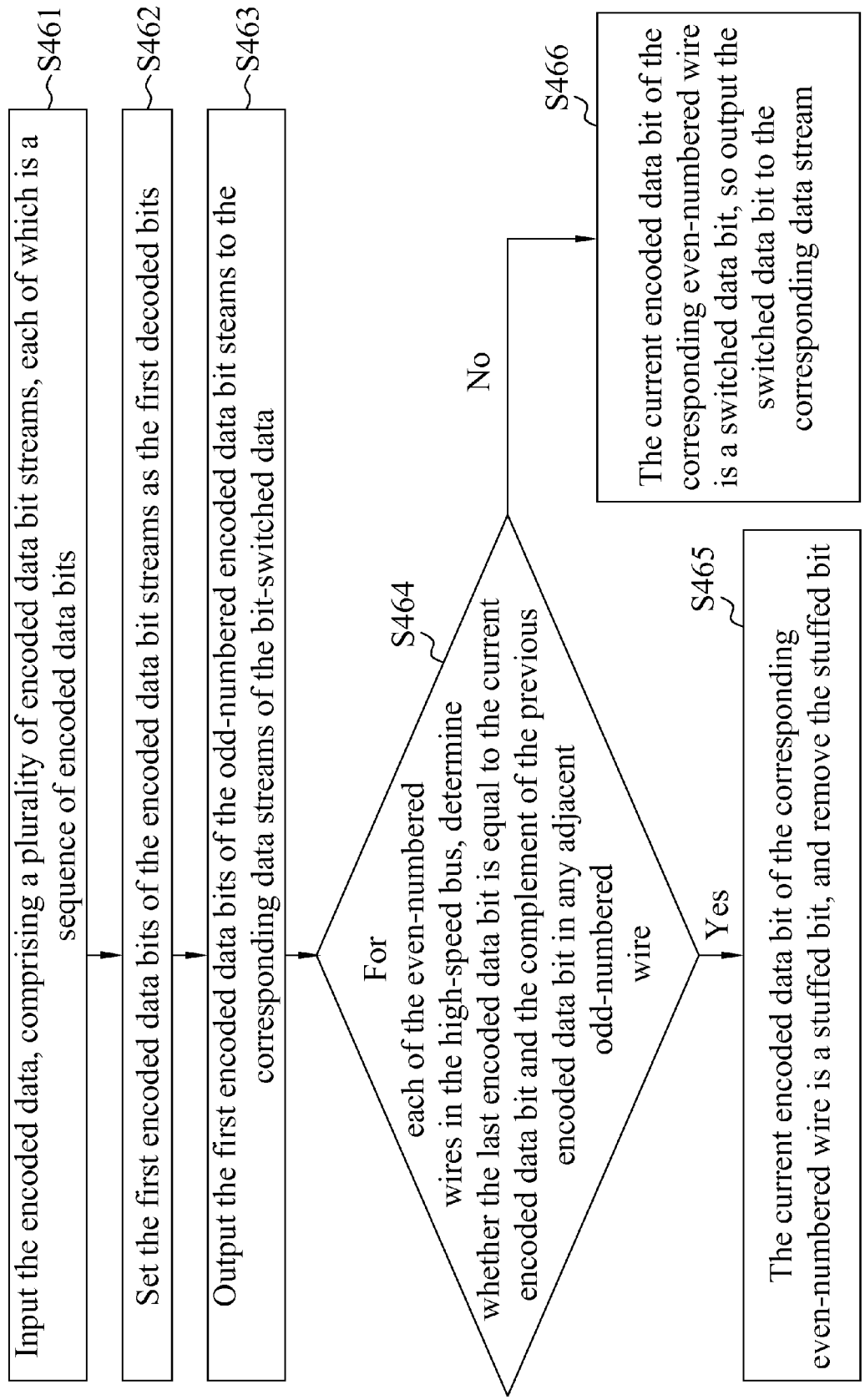
FIG. 17 is a flowchart showing the steps of the bit-removing decoding method according to the present invention.

FIG. 17 is a flowchart showing the steps of the bit-removing decoding method according to the present invention. The steps for bit-removing decoding include:

inputting the encoded data, comprising a plurality of encoded data bit streams, each of which is a sequence of coded bits (step S461);

setting the first coded bits of the encoded data bit streams as the first decoded bits (step S462);

outputting the first coded bits of the odd-numbered encoded data bit steams to the corresponding data streams of the bit-switched data (step S463);

for each of the even-numbered wires in the high-speed bus, determine whether the last encoded data bit is equal to the current encoded data bit and the complement of the previous encoded data bit in any adjacent odd-numbered wire (step S464); and if yes, the current encoded data bit of the corresponding even-numbered wire is a stuffed bit, and remove the stuffed bit (step S465); or if no, the current encoded data bit of the corresponding even-numbered wire is a switched data bits, so output the switched data bit to the corresponding data stream (step S466).

Bit-removing decoding unit 95 shown in FIG. 9 applies the above bit-removing decoding method to decode the encoded data bits $c_i(t)$, i=1, 2, . . . , n, to the bit-switched data 96 $\{b_{i,2}, b_{i,2}, \ldots \}$, i=1, 2, . . . , n. Wherein, the steps for the bit-removing decoding method are reverse procedures of the previously described steps for the bit-stuffing encoding method. At the beginning, $b_{i,1}$ is equal to $c_i(1)$, i=1, 2, . . . , n. When t is greater than or equal to 2, decoded bit-switched data are generated according to the following decoding rules: First, $c_i(t)$, i=1, 3, . . . , n-1, are output to the corresponding switched data streams; and, for i=2, 4, . . . , n, if $\bar{c}_{i-1}(t-1)=c_{i-1}(t)=c_i(t-1)$ or if $\bar{c}_{i+1}(t-1)=c_{i+1}(t)=c_i(t-1)$, $c_i(t)$ must be a stuffed bit and is therefore removed; otherwise, $c_i(t)$ is output to the corresponding switched data stream, where $\bar{c}_{i-1}(t-1)$ is the complement of $c_{i-1}(t-1)$ and $\bar{c}_{i+1}(t-1)$ is the complement of $c_{i\pm1}(t-1)$. As indicated by the following expressions, $c_i(t)$ is a stuffed bit if and only if at least one of the following equations holds, and the stuffed bit 0 or 1 at a position in the matrix corresponding to $c_i(t)$ as shown in the following equations will be removed.

$$\begin{bmatrix} c_{i-1}(t) & c_{i-1}(t-1) \\ c_i(t) & c_i(t-1) \end{bmatrix} = \begin{bmatrix} 1 & 0 \\ 1 & 1 \end{bmatrix} \text{ or } \begin{bmatrix} c_i(t) & c_i(t-1) \\ c_{i+1}(t) & c_{i+1}(t-1) \end{bmatrix} = \begin{bmatrix} 1 & 1 \\ 1 & 0 \end{bmatrix}$$

If at least one of the above two conditions holds, the stuffed bit 1 in the matrix at the position corresponding to $c_i(t)$ is removed.

$$\begin{bmatrix} c_{i-1}(t) & c_{i-1}(t-1) \\ c_i(t) & c_i(t-1) \end{bmatrix} = \begin{bmatrix} 0 & 1 \\ 0 & 0 \end{bmatrix} \text{ or } \begin{bmatrix} c_i(t) & c_i(t-1) \\ c_{i+1}(t) & c_{i+1}(t-1) \end{bmatrix} = \begin{bmatrix} 0 & 0 \\ 0 & 1 \end{bmatrix}$$

If at least one of the above two conditions holds, the stuffed bit 0 in the matrix at the position corresponding to $c_i(t)$ is removed.

When the number of data bits in the decoded data buffer is the same as the number of data bits in the corresponding input data bit stream, the remaining encoded data bits are the encoded data bits having been repeatedly transmitted by the bit-stuffing encoding unit and are therefore removed.

Figure 18:
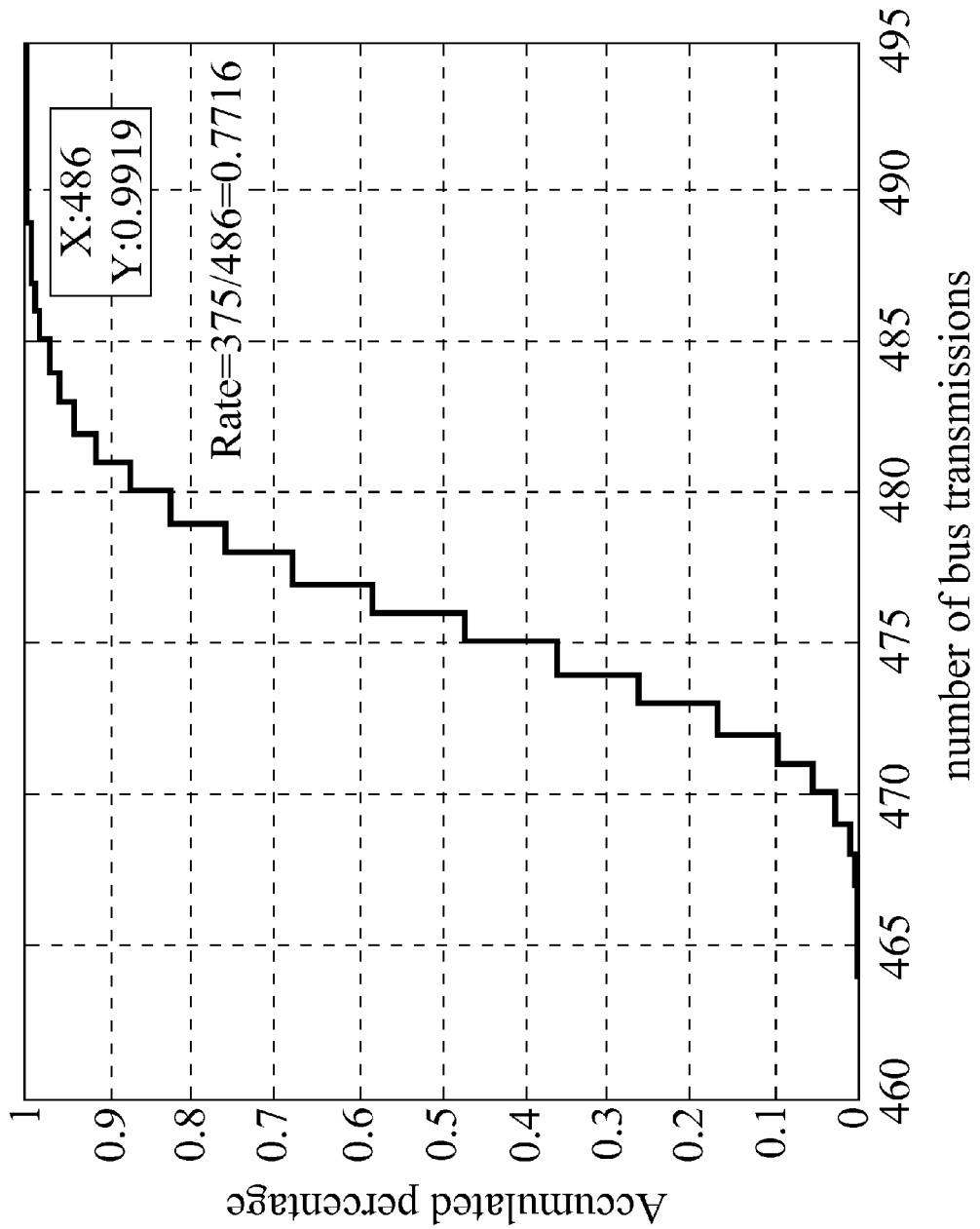
FIG. 18 is a graph displaying the statistics of the throughput performance of the bit-stuffing method for crosstalk avoidance in high-speed buses according to the present invention.

FIG. 18 is a graph displaying the statistics of the throughput performance of the bit-stuffing method for crosstalk avoidance in high-speed buses according to the present invention. Data shown in FIG. 18 is based on a simulation of transmitting a packet of length 1500 bytes over a bus with 32 wires, and thus there are (1500×8)/32=375 data bits to be transmitted over each wire in the bus. This is a reasonable condition in network transmissions. As can be seen from FIG. 18, more than 99% of the packet transmission can be completed within 486 bus transmissions. Thus, the coding rate of the bit-stuffing method under such setting is greater than 375/486=0.7716 with probability higher than 99%, and is much greater than the coding rates 0.5 and 0.6942 as can be obtained in the prior arts of bus encoding methods for crosstalk avoidance. Therefore, the bit-stuffing method for crosstalk avoidance in high-speed buses according to the present invention can indeed effectively avoid the occurrence of crosstalk and provides a coding rate higher than the prior art techniques to improve the transmission throughput of the system.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bit-stuffing method for crosstalk avoidance in high-speed buses, comprising the following steps:

inputting a plurality of data bit streams to a first data input buffer parallelly;

inputting the data bit streams from the first data input buffer to a first bit-switching unit parallelly;

switching a plurality of data bits to generate bit-switched data by the first bit-switching unit;

inputting the bit-switched data to a bit-stuffing encoding unit parallelly;

performing bit-stuffing encoding on the bit-switched data to generate bit-stuffed encoded data by the bit-stuffing encoding unit;

inputting the bit-stuffed encoded data to an encoded data buffer; and outputting the bit-stuffed encoded data to a high-speed bus by the encoded data buffer;

wherein the bit-stuffing encoding unit applies a bit-stuffing encoding method to encode the bit-switched data and generate the bit-stuffed encoded data, the bit-stuffing encoding method comprising the following steps:

inputting the plurality of data bit streams, and each of the data bit streams being a sequence of data bits;

setting a plurality of first data bits of the data bit streams as a plurality of encoded data bits for a first transmission;

inputting the first data bits of the data bit streams corresponding to a plurality of odd-numbered wires in the high-speed bus;

determining whether a last encoded data bit is equal to a current encoded data bit and a complement of a previous encoded data bit in any adjacent odd-numbered wire for each of a plurality of even-numbered wires in the high-speed bus; and if yes, stuffing a stuffed bit and delaying the transmission of the data bits of the corresponding data bit stream, and the stuffed bit is set as the last encoded data bit transmitted over the corresponding even-numbered wire; or if no, keeping transmitting the data bit of the data bit stream corresponding to the even-numbered wire.

2. The bit-stuffing method for crosstalk avoidance in high-speed buses as claimed in claim 1, wherein the bit-stuffed encoded data is decoded via a bit-removing decoding method, the bit-removing decoding method comprising the following steps:

inputting the bit-stuffed encoded data to a second data input buffer;

inputting the bit-stuffed encoded data to a bit-removing decoding unit by the second data input buffer to recover the bit-switched data; and inputting recovered bit-switched data to a second bit-switching unit to recover the data bits from the recovered bit-switched data.

3. The bit-stuffing method for crosstalk avoidance in high-speed buses as claimed in claim 1, wherein each of the data bit streams is formed of a sequence of data bits.

4. The bit-stuffing method for crosstalk avoidance in high-speed buses as claimed in claim 1, wherein the data bits are to be transmitted over a plurality of wires in the high-speed bus, and the number of the wires is equal to the number of the data bit streams.

5. The bit-stuffing method for crosstalk avoidance in high-speed buses as claimed in claim 1, wherein the first bit-switching unit is formed of a plurality of 2×2 switches.

6. The bit-stuffing method for crosstalk avoidance in high-speed buses as claimed in claim 1, wherein the first bit-switching unit switches the data bits from each pair of two adjacent data bit streams during the second of every two transmissions.

7. A bit-stuffing method for crosstalk avoidance in high-speed buses, comprising the following steps:

inputting a plurality of data bit streams to a first data input buffer parallelly;

inputting the data bit streams from the first data input buffer to a first bit-switching unit parallelly;

switching a plurality of data bits to generate bit-switched data by the first bit-switching unit;

inputting the bit-switched data to a bit-stuffing encoding unit parallelly;

performing bit-stuffing encoding on the bit-switched data to generate bit-stuffed encoded data by the bit-stuffing encoding unit;

inputting the bit-stuffed encoded data to an encoded data buffer; and outputting the bit-stuffed encoded data to a high-speed bus by the encoded data buffer;

wherein the bit-stuffed encoded data is decoded via a bit-removing decoding method, the bit-removing decoding method comprising the following steps:

inputting the bit-stuffed encoded data to a second data input buffer;

inputting the bit-stuffed encoded data to a bit-removing decoding unit by the second data input buffer to recover the bit-switched data; and inputting recovered bit-switched data to a second bit-switching unit to recover the data bits from the recovered bit-switched data;

wherein the bit-removing decoding unit applies the bit-removing decoding method to decode the bit-stuffed encoded data, so as to recover the data bits from the bit-switched data, the bit-removing decoding method comprising the following steps:

inputting the bit-stuffed encoded data, comprising a plurality of encoded data bit streams, each of which is a sequence of encoded data bits;

setting a plurality of first encoded data bits of the encoded data bit streams as a plurality of first decoded bits;

outputting the first encoded data bits of a plurality of odd-numbered encoded data bit steams to a plurality of corresponding data streams of the bit-switched data;

determining whether a last encoded data bit is equal to a current encoded data bit and a complement of a previous encoded data bit in any adjacent odd-numbered wire for each of a plurality of even-numbered wires in the high-speed bus; and if yes, a current encoded data bit of the corresponding even-numbered wires is a stuffed bit, and remove the stuffed bit; or if no, the current encoded data bit of the corresponding even-numbered wire is a switched data bit, so output the switched data bit to the corresponding data stream of the bit-switched data.

8. The bit-stuffing method for crosstalk avoidance in high-speed buses as claimed in claim 7, wherein each of the data bit streams is formed of a sequence of data bits.

9. The bit-stuffing method for crosstalk avoidance in high-speed buses as claimed in claim 7, wherein the data bits are to be transmitted over a plurality of wires in the high-speed bus, and the number of the wires is equal to the number of the data bit streams.

10. The bit-stuffing method for crosstalk avoidance in high-speed buses as claimed in claim 7, wherein the first bit-switching unit is formed of a plurality of 2×2 switches.

11. The bit-stuffing method for crosstalk avoidance in high-speed buses as claimed in claim 7, wherein the first bit-switching unit switches the data bits from each pair of two adjacent data bit streams during the second of every two transmissions.

* * * * *